US009699377B2

United States Patent
You et al.

(10) Patent No.: US 9,699,377 B2
(45) Date of Patent: Jul. 4, 2017

(54) DEPTH DETECTING APPARATUS AND METHOD, AND GESTURE DETECTING APPARATUS AND GESTURE DETECTING METHOD

(71) Applicant: SAMSUNG ELECTRONICS CO., LTD., Suwon-si (KR)

(72) Inventors: Jangwoo You, Seoul (KR); Yonghwa Park, Yongin-si (KR); Heesun Yoon, Seoul (KR); Myungjae Jeon, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/696,698

(22) Filed: Apr. 27, 2015

(65) Prior Publication Data

US 2016/0057340 A1 Feb. 25, 2016

(30) Foreign Application Priority Data

Aug. 22, 2014 (KR) ........................ 10-2014-0109967

(51) Int. Cl.
| | |
|---|---|
| *H04N 5/232* | (2006.01) |
| *G06K 9/00* | (2006.01) |
| *H04N 5/225* | (2006.01) |
| *H04N 5/222* | (2006.01) |
| *G06T 7/521* | (2017.01) |

(52) U.S. Cl.
CPC ..... *H04N 5/23229* (2013.01); *G06K 9/00355* (2013.01); *G06T 7/521* (2017.01); *H04N 5/2226* (2013.01); *H04N 5/2256* (2013.01); *G06T 2207/10016* (2013.01); *G06T 2207/10152* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 6,587,183 | B1 | 7/2003 | Uomori et al. |
| 6,639,656 | B2 | 10/2003 | Takada et al. |
| 8,350,847 | B2 | 1/2013 | Shpunt |

(Continued)

FOREIGN PATENT DOCUMENTS

| | | |
|---|---|---|
| JP | 4317300 B2 | 8/2009 |
| KR | 10-2012-0111013 A | 10/2012 |

OTHER PUBLICATIONS

Carrihill et al., "Experiments with the Intensity Ratio Depth Sensor", Courant Institute of Mathematical Sciences, Feb. 26, 1985, Computer Vision, Graphics, and Image Processing 32, 1985, 22 pages.

(Continued)

*Primary Examiner* — Roberto Velez
*Assistant Examiner* — Cynthia Segura
(74) *Attorney, Agent, or Firm* — Sughrue Mion, PLLC

(57) ABSTRACT

A gesture detecting apparatus including a light emitter configure to emit light towards an object, a camera configured to capture light emitted from the light emitter and reflected by the object, and a signal controller configured to control the light emitter and the camera, in which the light emitter comprises a first light and second light, at least one of which is configured to emit light having non-monotonic intensity characteristics.

18 Claims, 9 Drawing Sheets

(56) References Cited

U.S. PATENT DOCUMENTS

| | | | | |
|---|---|---|---|---|
| 9,304,594 B2 * | 4/2016 | Finocchio | | G06F 3/017 |
| 2009/0315825 A1 * | 12/2009 | Cauchi | | G06F 3/017 |
| | | | | 345/156 |
| 2011/0019205 A1 * | 1/2011 | Gerber | | G06K 9/00355 |
| | | | | 356/615 |
| 2013/0120238 A1 * | 5/2013 | Spaulding | | H05B 37/0227 |
| | | | | 345/156 |
| 2013/0134902 A1 * | 5/2013 | Mahale | | H05B 37/0227 |
| | | | | 315/297 |
| 2013/0163627 A1 * | 6/2013 | Seurin | | H01S 5/423 |
| | | | | 372/36 |
| 2013/0229499 A1 * | 9/2013 | Zhao | | G06F 3/0482 |
| | | | | 348/51 |
| 2013/0249861 A1 * | 9/2013 | Chang | | G06F 3/0412 |
| | | | | 345/174 |
| 2014/0048709 A1 * | 2/2014 | Lo | | G06F 3/011 |
| | | | | 250/340 |
| 2014/0104592 A1 * | 4/2014 | Tien | | G01S 17/89 |
| | | | | 356/5.01 |
| 2014/0139488 A1 * | 5/2014 | Hsu | | H04N 5/04 |
| | | | | 345/175 |
| 2015/0029086 A1 * | 1/2015 | Mankowski | | G06F 3/017 |
| | | | | 345/156 |
| 2015/0253428 A1 * | 9/2015 | Holz | | G01S 17/42 |
| | | | | 356/5.01 |
| 2016/0054812 A1 * | 2/2016 | Yoon | | G06F 3/017 |
| | | | | 345/156 |
| 2016/0120000 A1 * | 4/2016 | Chen | | H05B 37/0281 |
| | | | | 315/155 |
| 2016/0194181 A1 * | 7/2016 | Wang | | B66B 1/468 |
| | | | | 348/77 |
| 2016/0371845 A1 * | 12/2016 | Yasovsky | | G06T 7/0065 |

OTHER PUBLICATIONS

Azuma et al., "Development of a Video-Rate Rangefinder System Using Light Intensity Modulation with Scanning Laser Light", Systems and Computers in Japan, vol. 37, No. 3, 2006, 12 pages.

* cited by examiner

DEPTH DETECTING APPARATUS AND METHOD, AND GESTURE DETECTING APPARATUS AND GESTURE DETECTING METHOD

RELATED APPLICATION

This application claims the benefit of Korean Patent Application No. 10-2014-0109967, filed on Aug. 22, 2014, in the Korean Intellectual Property Office, the disclosure of which is incorporated herein in its entirety by reference.

BACKGROUND

1. Field

The present disclosure relates to a depth detecting apparatus and method for detecting a position of an object, and a gesture detecting apparatus and gesture detecting method for accurately detecting a gesture of an object.

2. Description of the Related Art

To acquire a depth image of an object, time-of-flight (TOF) or triangulation may be used.

When TOF is used, an infrared (IR) light is emitted from a source toward an object and a depth image of the object is generated based on the TOF taken by the IR light reflected back to the source. This method requires the use of a dedicated complementary metal oxide semiconductor (CMOS) image sensor (CIS) or a high-speed intensity modulator, which is generally referred to as an optical shutter. When a dedicated CIS is used, a function that modulates the intensity of light in each pixel must be provided, which requires an increased chip size and which increases power consumption.

When triangulation is used, pattern-emitting lighting and a dedicated high-speed image processing for an application specific integrated circuit (ASIC) for extracting depth information from a pattern change are required. Conventionally, during triangulation, a position of the lighting pattern may change proportionally to a distance to an object and increased computing power may be needed to extract a position change of the lighting pattern.

SUMMARY

Provided is a depth detecting apparatus capable of detecting a depth of an object.

Provided is a depth detecting method for detecting a depth of an object by using a depth detecting sensor.

Provided is a gesture detecting apparatus capable of detecting a gesture of an object.

Provided is a gesture detecting method for detecting a gesture of an object by using a gesture detecting sensor.

Additional aspects will be set forth in part in the description which follows and, in part, will be apparent from the description, or may be learned by practice of the presented embodiments.

According to an aspect of the present invention, a gesture detecting apparatus is provided. The gesture detecting apparatus includes a light emitter configure to emit light towards an object, a camera configured to capture light emitted from the light emitter and reflected by the object, and a signal controller configured to control the light emitter and the camera, in which the light emitter includes a first light and a second light, at least one of which is configured to emit light having non-monotonic intensity.

The gesture detecting apparatus may further include an image processor connected to the signal controller, the image processor being configured to generate an image representing light captured by the camera.

The gesture detecting apparatus may further include a storage connected to the signal controller configured to store object information.

The light emitter may include a plurality of light sources and a plurality of beam shapers.

The first light may include a first light source from among the plurality of light sources and a first beam shaper from among the plurality of beam shapers and the second light may include a second light source from among the plurality of light sources and a second beam shaper from among the plurality of beam shapers.

The light emitter may include one or more light sources configured to emit an infrared ray or a near-infrared ray.

The light emitter may include a laser diode (LD) or a light emitting diode (LED).

The camera may include an image sensor.

The image sensor may include a charge coupled device (CCD) or a complementary metal oxide semiconductor (CMOS) image sensor (CIS).

The camera unit may further include a band pass filter configured to allow light in a band corresponding to a wavelength of the light emitted by the light emitter to pass through, and to block light in another band.

According to another aspect of the present invention, there is provided a gesture detecting method. The gesture detecting method includes emitting light having non-monotonic intensity characteristics toward an object from a lighting unit, capturing light reflected from the object after being emitted toward the object by using a camera unit, and analyzing image information captured by the camera unit by using a signal processing unit.

The lighting unit may include a first light and a second light, at least one of which emits light having non-monotonic intensity characteristics.

The gesture detecting method may further include emitting light toward the object from the first light and capturing light reflected from the object by using the camera unit, emitting light toward the object from the second light and capturing light reflected from the object by using the camera unit, and capturing an image by using the camera unit when a light is not emitted from the lighting unit.

The lighting unit may be a signal control unit, and the signal control unit may include a switching unit that controls an on/off state and an intensity of the lighting unit.

The signal control unit may detect the object and a gesture based on an intensity ratio, an intensity difference, or a combination thereof by using first intensity information of the first light and second intensity information of the second light, the first intensity information and the second intensity information being captured by the camera unit.

According to another aspect of the present invention, a depth detecting apparatus is provided. The depth detecting apparatus includes a first light configured to emit light having non-monotonic intensity characteristics towards an object; a camera configured to capture light emitted by the first light and reflected by the object; and a signal controller configured to determine a depth of the object based on the captured reflected light.

The camera may be further configured to capture an image of the object when light is not emitted by the first light, and the signal controller may be further configured to associate the determined depth of the object with the representation of the object in the captured image.

The signal controller may be further configured to control an intensity of the light emitted by the first light.

The depth detecting apparatus may further include a second light configured to emit light towards the object. The camera may be further configured to capture light emitted by the second light and reflected by the object, and the signal controller may be configured to determine the depth of the object based on a comparison of a first intensity of the captured light emitted by the first light and a second intensity of the captured light emitted by the second light.

The signal controller may be configured to determine the depth of the object based on at least one of an intensity ratio of the first intensity and the second intensity, and an intensity difference of the first intensity and the second intensity.

According to another aspect of the present invention, a depth detecting method is provided. The depth detecting method includes: emitting a first light having non-monotonic intensity characteristics toward an object; capturing the first light reflected by the object; and determining a depth of the object based on the captured reflected first light.

The depth detecting method may further include: emitting a second light toward the object; and capturing the second light reflected by the object. The determining may include determining the depth of the object based on a comparison of a first intensity of the captured reflected first light and a second intensity of the captured reflected second light.

The determining may include determining the depth of the object based on at least one of an intensity ratio of the first intensity and the second intensity, and an intensity difference of the first intensity and the second intensity.

BRIEF DESCRIPTION OF THE DRAWINGS

These and/or other aspects will become apparent and more readily appreciated from the following description of one or more exemplary embodiments, taken in conjunction with the accompanying drawings in which.

DETAILED DESCRIPTION

Figure 1:
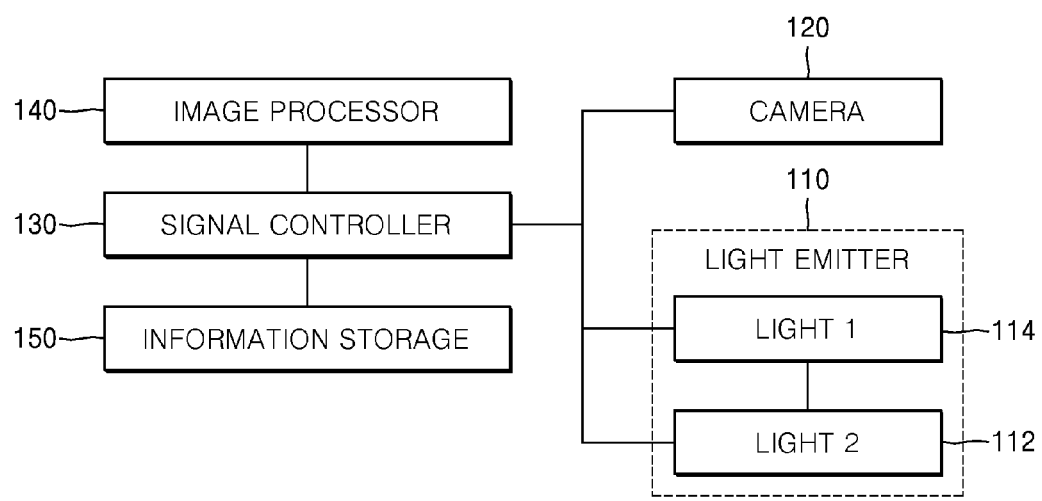
FIG. 1 is a block diagram schematically illustrating a gesture or depth detecting apparatus according to an exemplary embodiment.

Hereinafter, a depth detecting apparatus and a depth detecting method using the same, and a gesture detecting apparatus and a gesture detecting method using the same according to one or more exemplary embodiments will be described in detail with reference to the accompanying drawings. Throughout the drawings, like reference numerals refer to like elements, and the size of each element may be exaggerated for clarity and convenience.

FIG. 1 is a block diagram schematically illustrating a gesture or depth detecting apparatus according to an exemplary embodiment.

Referring to FIG. 1, the gesture or depth detecting apparatus may include a light emitter 110, i.e. a lighting unit, including first light (light 1) 114 and second light (light 2) 112, and a camera 120, i.e. a camera unit, capable of capturing light reflected from an object after being emitted from the light emitter 110. The gesture or depth detecting apparatus may also include a signal controller 130, i.e. a signal controller unit, that controls the light emitter 110 and the camera 120, an image processor 140 that is connected to the signal controller 130 and generates an image of the object for a display or the like to allow a user to check the image, and a storage 150 capable of storing object information detected by the gesture or depth detecting apparatus.

Each of the first light 114 and the second light 112 of the light emitter 110 may include a light source and a beam shaper. The light source may emit, for example, an infrared ray or a near infrared ray. The light source may be a laser diode (LD) or a light emitting diode (LED). The beam shaper may be disposed in a light-emitting unit of the light source, and light emitted from the light source may be emitted to an object through the beam shaper. At least one of the first light 114 or the second light 112 of the light emitter 110 emits light having non-monotonic intensity characteristics. For example, when a gesture or depth of an object is to be detected using the gesture or depth detecting apparatus, the intensity of light emitted from the first light 114 may gradually increase and the intensity of light emitted from the second light 112 may gradually decrease. Alternatively, the intensity of light emitted from the first light 114 may decease and the intensity of light emitted from the second light 112 may gradually increase. The light emitted from the first light 114 may be non-monotonic and the light emitted from the second light 112 may be either monotonic or non-monotonic. The light emitted from the second light 112 may be non-monotonic and the light emitted from the first light 114 may be either monotonic or non-monotonic.

The camera 120 may include an image sensor that may be, for example, a charge coupled device (CCD) or a complementary metal oxide semiconductor (CMOS) image sensor (CIS). The camera 120 may include a band pass filter through which light in a band corresponding to a wavelength of light emitted from the first light 114 and the second light 112 may pass, and light in other bands may be blocked. The camera 120 may include an image sensor having a one-dimensional (1D) or two-dimensional (2D) array structure.

The gesture or depth detecting apparatus emits light to an external object from the first light 114 and captures the light reflected from the object through the camera 120. Thereafter, the gesture or depth detecting apparatus emits light from the second light 112 and captures light reflected from the object through the camera 120. Then, an image is captured by the camera 120 without emitting light from the light emitter 110. Image information captured by the camera 120 is analyzed by the signal controller 130. The signal controller 130 may include a switch capable of controlling an on/off state and an intensity of the light emitter 110. If ambient light is strong in an area where the object is placed, the signal control unit 130 may increase the power of the light emitter 110 and may control the gesture or depth detecting apparatus to operate in a burst mode, reducing an on-operation time.

Figure 2:
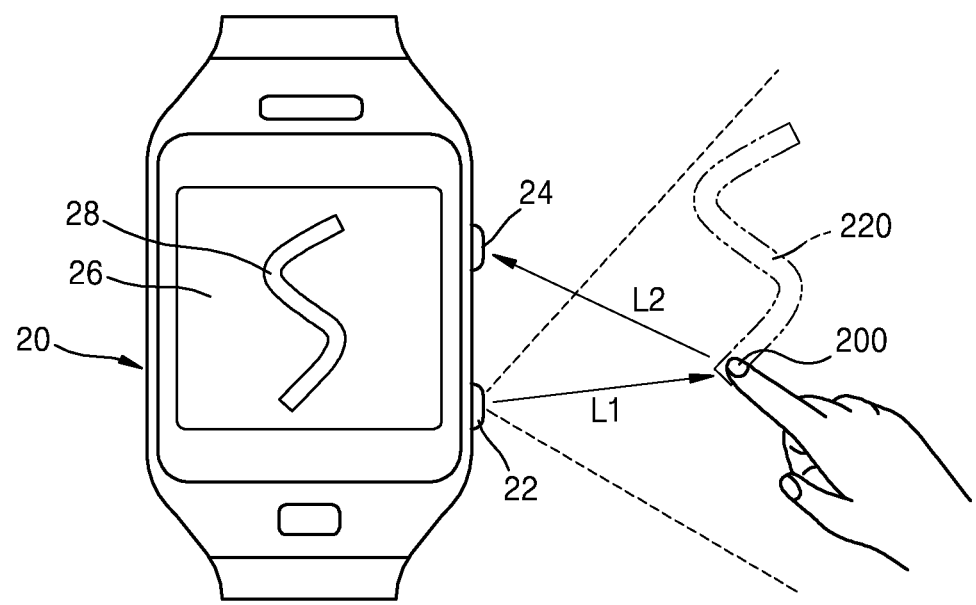
FIG. 2 illustrates detection of a gesture of an object by using a wearable device including a gesture detecting apparatus according to an exemplary embodiment.

FIG. 2 illustrates detection of a gesture of the object by using a wearable device including the gesture detecting apparatus according to an exemplary embodiment.

Referring to FIG. 2, a wearable device 20 may include a light emitter 22 that emits light L1 towards an object 200 and a camera 24 onto which light L2 reflected from the object 200 is incident. The wearable device 20 may include a display 26, i.e. a display unit, and may represent a gesture 220 of the object 200 as an image 28 corresponding to position information detected by the gesture detecting apparatus. The wearable device 20 may have various forms, and may be, for example, a wrist-watch type or glasses-type wearable device. The gesture detecting apparatus may be mounted on various electronic devices such as a cellular phone, a tablet personal computer (PC), a laptop computer, or a television (TV).

Figure 3A:
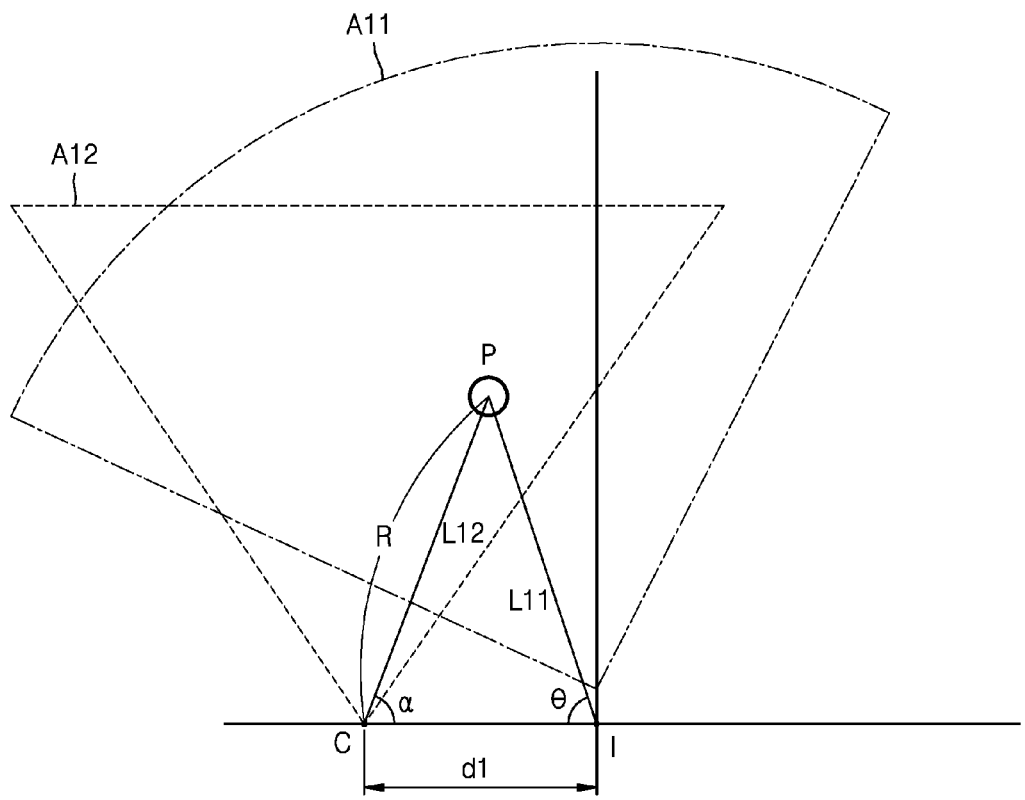
FIG. 3A illustrates a basic example of a gesture detecting method using a gesture detecting apparatus according to an exemplary embodiment.

FIG. 3A illustrates a basic example of a gesture detecting method using a gesture detecting apparatus.

Referring to FIG. 3A, a line connecting a lighting unit I with a camera unit C is set as a reference line. An object P located outside the gesture detecting is within a range A11 in which light L11 emitted from the light source I is emitted and also within a viewing angle range A12 of the camera C. In the gesture detecting apparatus, a distance d1 between the light emitter I and the camera C may be fixed. The light L11 is emitted toward the object P from the light emitter I and light L12 reflected from the object P is incident onto the camera C. If an angle between the object P and the light emitter I with respect to the reference line is θ and an angle between the object P and the camera unit C with respect to the reference line is a, a distance R between the object P and the camera unit C may be calculated as follows:

$$R = d \times \tan\theta / (\sin(\alpha) + \tan(\theta)\cos(\alpha)) \quad (1)$$

Since the angle θ between the object P and the light emitter I with respect to the reference line and the angle α between the object P and the camera C with respect to the reference line are known, position information of the object P in a space may be obtained. By continuously obtaining such position information, gesture information regarding the object P in the space may also be obtained.

As an alternative, a basic example of a depth detecting method using a depth detecting apparatus would detect the position information once or occasionally. As a non-limiting example, if the depth detecting apparatus were combined with a photographic camera, the depth detecting method may be executed once corresponding to a photograph being taken.

Figure 3B:
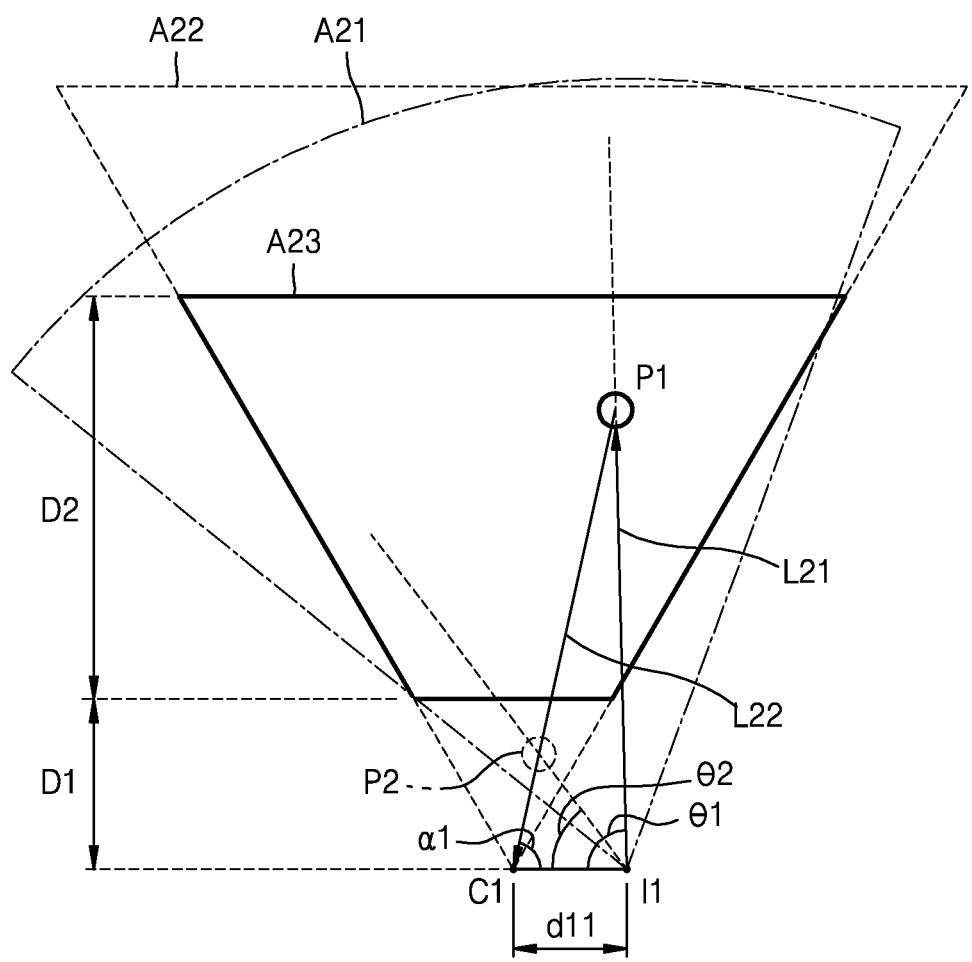
FIG. 3B illustrates an example of determining a distance to an actual object from a distance measured via a gesture or depth detecting method using a gesture or depth detecting apparatus according to an exemplary embodiment.

FIG. 3B illustrates an example of determining a distance to an actual object from a distance measured by using a gesture or depth detecting method using a gesture or depth detecting apparatus according to an exemplary embodiment.

Referring to FIG. 3B, a line connecting a light emitter 11 with a camera C1 is set as a reference line d11, and a position of an object P1 located in a range A21 in which light L21 emitted from the light emitter 11 is emitted and in a range of a viewing angle range A22 of the camera C1 is measured. According to the gesture or depth detecting apparatus, a distance d11 between the light emitter 11 and the camera C1 may be fixed. Light L21 is emitted from the light emitter 11 toward the object P1, and light L22 reflected from the object P1 is incident onto the camera C1. As described with reference to FIG. 1, the gesture or depth detecting method performed with regard to the object P1 by using the gesture or depth detecting apparatus includes emitting the light L12 from the first light 114 of the light emitter 11 and then capturing the light L22 reflected from the object P1 by using the camera C1. When light is not emitted from the light emitter 11, an image is captured by the camera C1. A method for distinguishing between an actual object P1 and an illusory object P2 will be discussed below.

Figure 4A:
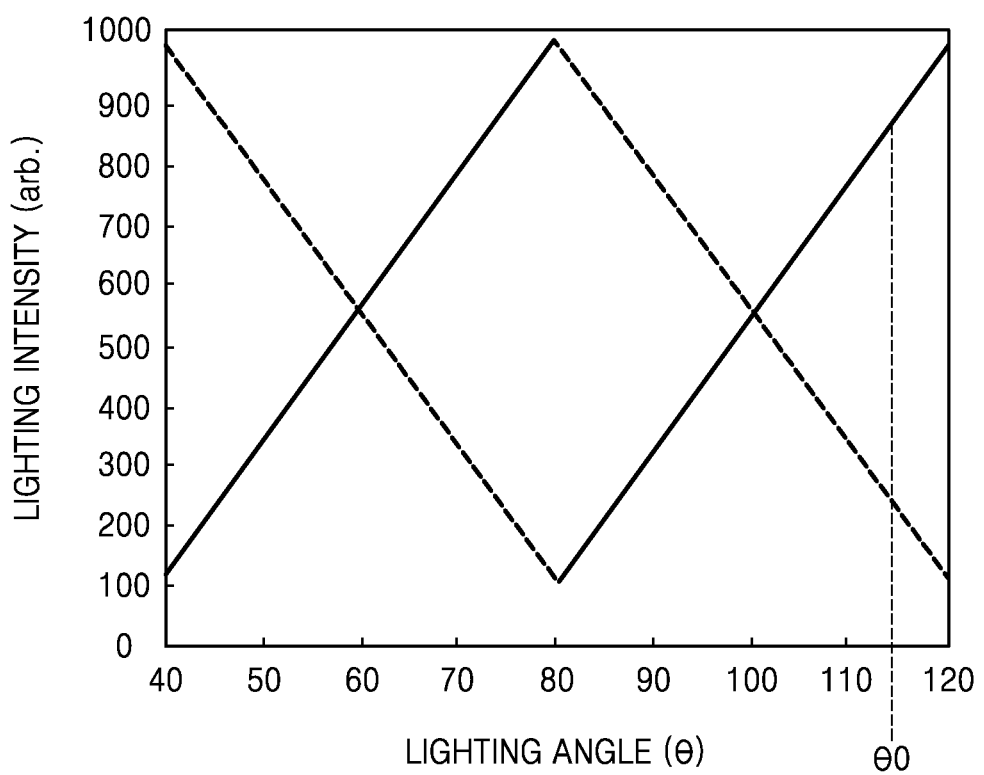
FIG. 4A is a graph illustrating a light intensity with respect to a lighting angle of a gesture or depth detecting apparatus according to an exemplary embodiment.
Figure 4B:
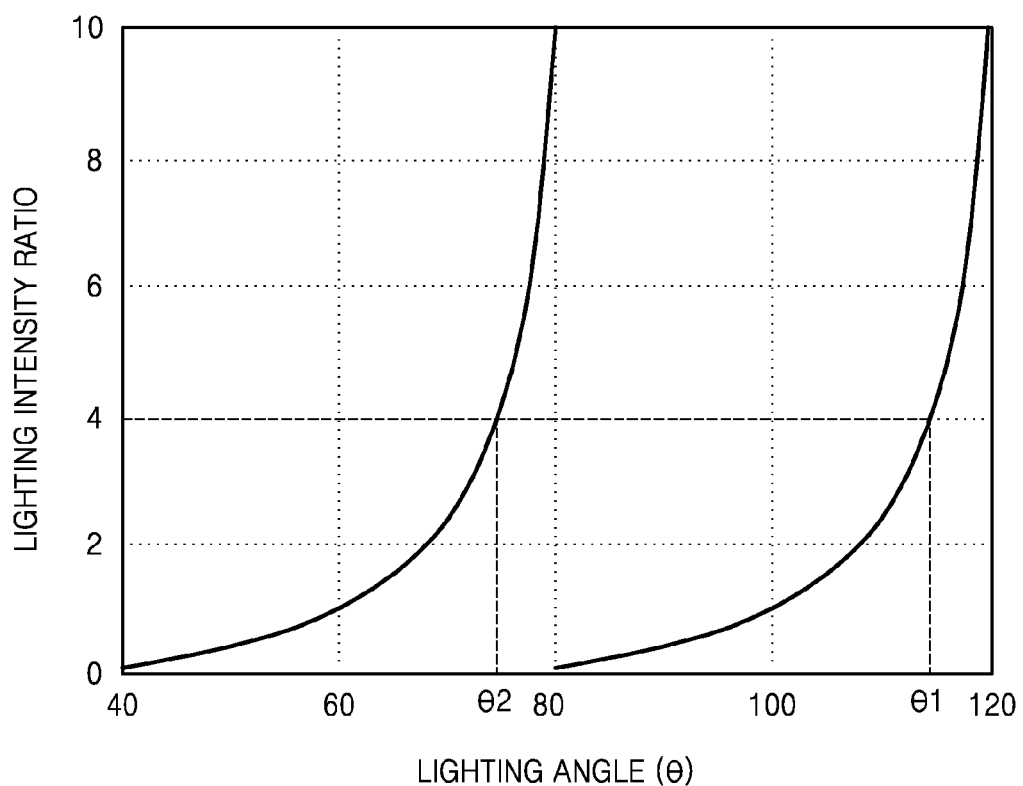
FIG. 4B is a graph illustrating a light intensity ratio with respect to a lighting angle of a gesture or depth detecting apparatus according to an exemplary embodiment.

A lighting intensity value measured from each of the first light 114 and the second light 112 of the lighting unit 11 is shown in FIG. 4A, and a light intensity ratio of the measured light intensity values of the first light 114 and the second light 112 is shown in FIG. 4B.

FIG. 4A is a graph illustrating a light intensity with respect to a light angle of the gesture or depth detecting apparatus according to an exemplary embodiment. In FIG. 4A, the light intensity of the first light 114 is indicated by a solid line and the light intensity of the second light 112 is indicated by a dotted line. It can be seen from FIG. 4A that both the light intensity of the first light 114 and the light intensity of the second light 112 have non-monotonic characteristics. To measure a distance to an object, a lighting angle θ0 may be extracted using the light intensities.

FIG. 4B is a graph illustrating a light intensity ratio with respect to a lighting angle of a gesture or depth detecting apparatus according to an exemplary embodiment.

Referring to FIG. 4B, a quotient obtained by dividing the light intensity of the first light 114 by the light intensity of the second light 112 in FIG. 4A, that is, a light intensity ratio with respect to a lighting angle, may be expressed via two similar graphs. For example, in FIG. 4B, a lighting angle θ with respect to a light intensity ratio may be about 4 at lighting angles θ1 and θ2.

In this case, as shown in FIG. 3B, two objects P1 and P2 located at the angles θ1 and θ2 with respect to the reference line may be indicated. To extract respective distances between the objects P1 and P2 and the camera C1, an operation of identifying an actual object between the two objects P1 and P2 may be needed. To this end, various methods may be used. For example, as shown in FIG. 3B, the object P1 corresponding to a region A23 of interest may be selected as an actual object and the object P2 within a first distance D1 from the reference line connecting the light emitter L1 with the camera C1 may be disregarded as an illusory object. A region A23 within a particular distance (an area between D1 and (D1+D2)) may be set as a region of interest. In this way, the distance between the actual object P1 and the camera C1 may be measured. If reflective properties of the object P1 are known in advance, the actual object P1 may be easily determined.

The light intensity of the light emitter of the gesture or depth detecting apparatus according to an exemplary embodiment may have various structures and the phase, period, and size of the light intensity may be adjusted arbitrarily.

Figure 5A:
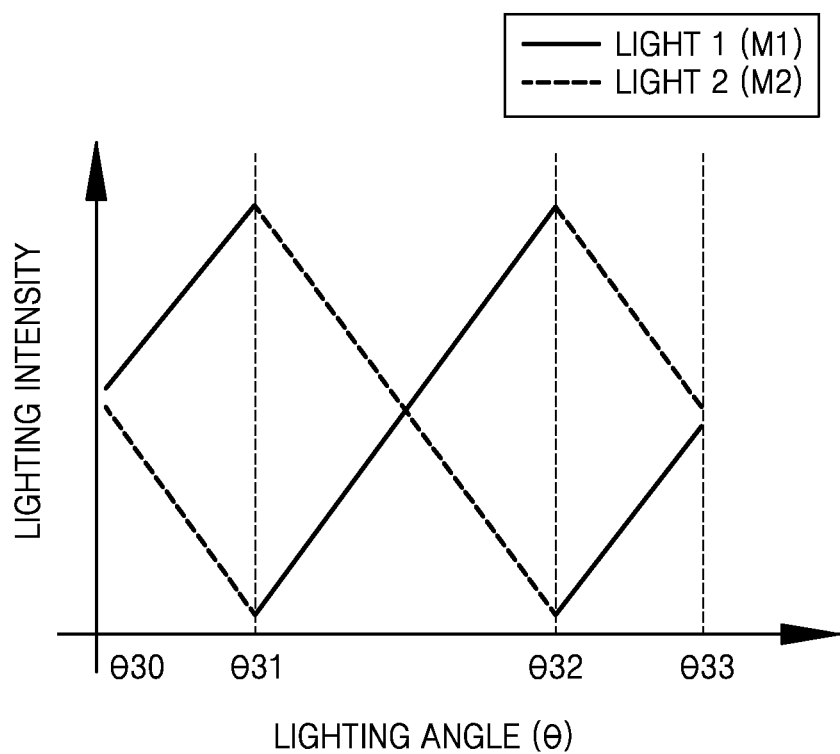
FIG. 5A is a graph illustrating a light intensity with respect to a lighting angle of a gesture or depth detecting apparatus according to an exemplary embodiment.

FIG. 5A is a graph illustrating a light intensity with respect to a lighting angle of a gesture or depth detecting apparatus according to an exemplary embodiment.

Referring to FIG. 5A, the light intensity of the first light 114 of FIG. 1 is indicated by a solid line and the light intensity of the second light 112 of FIG. 1 is indicated by a dotted line. The light intensity of the first light 114 gradually increases from a lighting angle θ30 to a lighting angle θ31, and the light intensity of the second light 112 gradually decreases from θ30 to θ31. The light intensity of the second light 112 gradually decreases from the lighting angle θ31 to a lighting angle θ32, and the light intensity of the first light 114 gradually increases from θ31 to θ32. The light intensity of the first light 114 gradually increases from the lighting angle θ32 to a lighting angle θ33, and the light intensity of the second light 112 gradually decreases from θ32 to θ33.

Figure 5B:
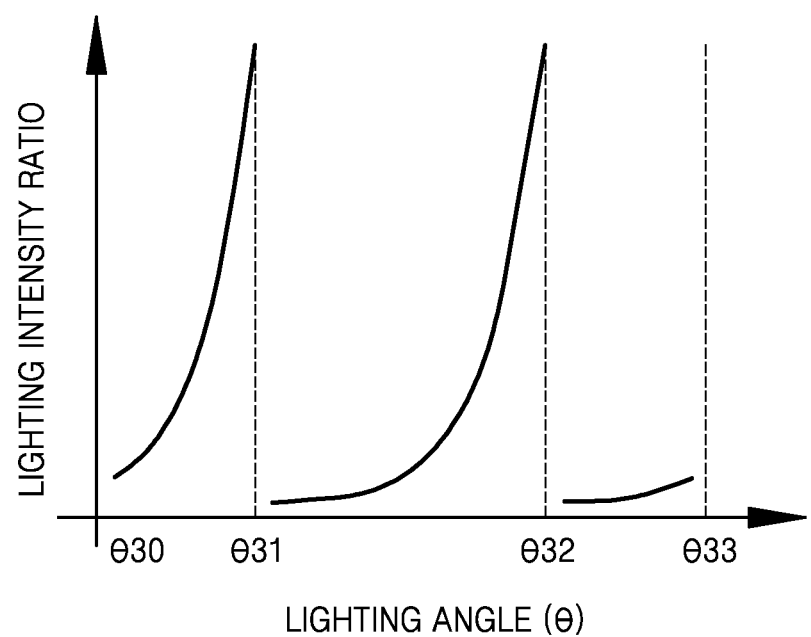
FIG. 5B is a graph illustrating a light intensity ratio with respect to a lighting angle of a gesture or depth detecting apparatus according to an exemplary embodiment.
Figure 5C:
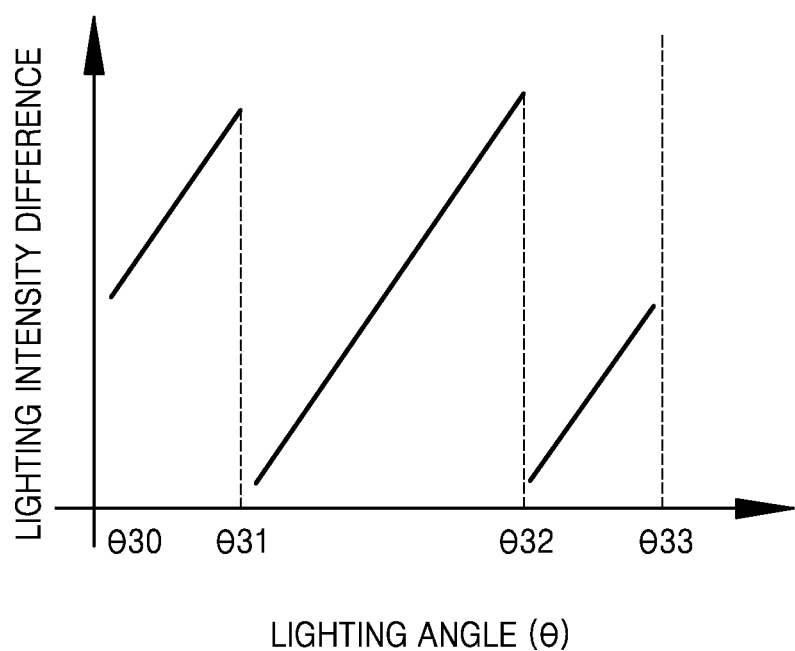
FIG. 5C is a graph illustrating a light intensity difference with respect to a lighting angle of a gesture or depth detecting apparatus according to an exemplary embodiment.

A ratio of a light intensity M1 of the first light 114 to a light intensity M2 of the second light 112, M1/M2, is shown in FIG. 5B. A ratio of a difference between the light intensity M1 of the first light 114 and the light intensity M2 of the second light 112 to a sum of the light intensity M1 of the first light 114 and the light intensity M2 of the second light 112 is shown in FIG. 5C. As such, according to the gesture or depth detecting apparatus, the signal controller 130 of FIG. 1 may detect a distance to the object P1 and a position of the object P1 based on various values, for example, an intensity ratio (M1/M2), an intensity difference ((M1-M2)/(M1+M2)), or various combinations thereof, by using the light intensity M1 of the first light 114 and the light intensity M2 of the second light 112.

As described above, the gesture or depth detecting apparatus may detect a distance to an object located outside the gesture or depth detecting apparatus and a spatial position of the object by analyzing a non-monotonic intensity of a lighting unit. Moreover, the gesture or depth detecting method may provide improved-precision object gesture or depth detection through analysis of intensities of first lighting and second lighting.

It should be understood that the exemplary embodiments described therein should be considered descriptive and are non-limiting. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the present invention as defined by the following claims.

What is claimed is:

1. A gesture detecting apparatus comprising:
    a light emitter comprising a first light source and a second light source which are configured to emit light towards an object;
    a camera configured to detect the light emitted by the first light source and the second light source and reflected from the object; and
    a signal controller configured to control the first light source and the second light source to emit the light by gradually increasing a light intensity of the first light source and gradually decreasing a light intensity of the second light source from a first light angle to a second light angle, and gradually decreasing the light intensity of the first light source and gradually increasing the light intensity of the second light source from the second light angle to a third light angle, and to control the camera to capture an image based on the detected light,
    wherein the light intensity of the first light and the light intensity of the second light have non-monotonic characteristics.

2. The gesture detecting apparatus of claim 1, further comprising an image processor configured to generate a visual representation of the image captured by the camera.

3. The gesture detecting apparatus of claim 1, further comprising a storage connected to the signal controller and configured to store object information.

4. The gesture detecting apparatus of claim 1, wherein the light emitter further comprises a plurality of beam shapers.

5. The gesture detecting apparatus of claim 4, wherein the plurality of beam shapers comprises a first beam shaper corresponding to the first light source and a second beam shaper corresponding to the second light source.

6. The gesture detecting apparatus of claim 1, wherein at least one among the first and second light sources is configured to emit an infrared ray or a near-infrared ray.

7. The gesture detecting apparatus of claim 1, wherein the at least one among the first and second light sources comprises a laser diode (LD) or a light emitting diode (LED).

8. The gesture detecting apparatus of claim 1, wherein the camera comprises an image sensor.

9. The gesture detecting apparatus of claim 8, wherein the image sensor comprises a charge coupled device (CCD) or a complementary metal oxide semiconductor (CMOS) image sensor (CIS).

10. The gesture detecting apparatus of claim 1, wherein the camera comprises a band pass filter configured to allow light in a band corresponding to a wavelength of the light emitted by the first and second light sources to pass through, and to block light in another band.

11. A gesture detecting method comprising:
    emitting light having non-monotonic intensity characteristics toward an object from a first light source and a second light source by controlling a light intensity of the first light source to gradually increase and a light intensity of the second light source to gradually decrease from a first light angle to a second light angle, and controlling the light intensity of the first light source to gradually decrease and the light intensity of the second light source to gradually increase from the second light angle to a third light angle;
    detecting the emitted light reflected from the object by a camera; and
    detecting the gesture by analyzing image information captured by the camera, by a signal processing unit,
    wherein the light intensity of the first light source and the light intensity of the second light source have non-monotonic characteristics.

12. The gesture detecting method of claim 11, further comprising:
    capturing an image by using the camera when the light is not emitted from the first light source and the second light source.

13. The gesture detecting method of claim 12, wherein the signal processing unit detects the object and the gesture based on an intensity ratio, an intensity difference, or a combination thereof by using first intensity information of the first light source and second intensity information of the second light source, the first intensity information and the second intensity information being detected by the camera.

14. The gesture detecting method of claim 11, wherein the controlling comprises:
    controlling the first light source and the second light source with a switching unit that controls an on/off state and the light intensities of the first light source and the second light source.

15. A depth detecting apparatus comprising:
    a first light source and a second light source which are configured to emit light towards an object;
    a camera configured to detect the light emitted by the first light source and the second light source and reflected from the object; and
    a signal controller configured to control the first light source and the second light source to emit the light by gradually increasing a light intensity of the first light source and gradually decreasing a light intensity of the second light source from a first light angle to a second light angle, and gradually decreasing the light intensity of the first light source and gradually increasing the light intensity of the second light source from the second light angle to a third light angle, and to determine a depth of the object based on the reflected light detected by the camera, wherein the light intensity of the first light source and the light intensity of the second light source have non-monotonic characteristics.

16. The depth detecting apparatus according to claim 15, wherein the camera is further configured to capture an image of the object when light is not emitted by the first light source and the second light source, and wherein the signal controller is further configured to associate the determined depth of the object with a representation of the object in the captured image.

17. The depth detecting apparatus according to claim 15, wherein the signal controller is configured to determine the depth of the object based on a comparison of a first intensity of the detected reflected light emitted by the first light source and a second intensity of the detected reflected light emitted by the second light source.

18. The depth detecting apparatus according to claim 17, wherein the signal controller is configured to determine the depth of the object based on at least one among an intensity ratio of the first intensity and the second intensity, and an intensity difference of the first intensity and the second intensity.

* * * * *